United States Patent
Kim

(10) Patent No.: US 11,950,980 B1
(45) Date of Patent: Apr. 9, 2024

(54) TOOTH IMPLANT SYSTEM

(71) Applicant: Kwang Seob Kim, Henderson, NV (US)

(72) Inventor: Kwang Seob Kim, Henderson, NV (US)

( * ) Notice: Subject to any disclaimer, the term of this patent is extended or adjusted under 35 U.S.C. 154(b) by 0 days.

(21) Appl. No.: 18/235,757

(22) Filed: Aug. 18, 2023

(51) Int. Cl.
*A61C 8/00* (2006.01)

(52) U.S. Cl.
CPC .......... *A61C 8/0057* (2013.01); *A61C 8/0062* (2013.01); *A61C 8/0068* (2013.01)

(58) Field of Classification Search
CPC .... A61C 8/0057; A61C 8/0062; A61C 8/0068
See application file for complete search history.

(56) References Cited

U.S. PATENT DOCUMENTS

| | | | | |
|---|---|---|---|---|
| 2,866,285 A * | 12/1958 | Gerber | ................... | A61C 13/30 433/219 |
| 4,044,403 A * | 8/1977 | D'Errico | ................... | A61F 2/32 623/22.17 |
| 4,416,629 A * | 11/1983 | Mozsary | .............. | A61C 8/0086 433/173 |
| 4,447,210 A * | 5/1984 | Hidaka | ................ | A61C 8/0086 433/169 |
| 4,552,532 A * | 11/1985 | Mozsary | .............. | A61C 8/0086 433/173 |
| 4,681,542 A * | 7/1987 | Baum | ...................... | A61C 5/70 433/172 |
| 4,756,689 A * | 7/1988 | Lundgren | .............. | A61C 8/005 433/169 |
| 4,927,363 A * | 5/1990 | Schneider | ............ | A61C 8/0086 433/169 |
| 4,957,437 A * | 9/1990 | Shimura | .............. | A61C 8/0086 433/201.1 |
| 5,033,962 A * | 7/1991 | Scatena | ................... | A61C 8/005 433/169 |
| 5,417,570 A * | 5/1995 | Zuest | ................... | A61C 13/2656 433/172 |
| 5,782,918 A * | 7/1998 | Klardie | ................ | A61C 8/0069 433/172 |
| 5,954,505 A * | 9/1999 | Ford | ..................... | A61C 8/0086 433/177 |
| 6,299,447 B1 * | 10/2001 | Zuest | ..................... | A61C 8/005 433/172 |
| 6,743,018 B1 * | 6/2004 | Morrow | ............... | A61C 8/0054 433/172 |
| 9,204,943 B1 * | 12/2015 | Zadeh | ..................... | A61K 6/20 |

(Continued)

*Primary Examiner* — Nicholas D Lucchesi
*Assistant Examiner* — Hao D Mai
(74) *Attorney, Agent, or Firm* — PARK LAW FIRM

(57) ABSTRACT

A tooth implant system has an upper abutment, a lower abutment, a crown, and an elastic member securely placed between the upper abutment and the lower abutment providing softer and elastic, yet resilient, cushion between the upper abutment and the lower abutment. To better affix the elastic member within the tooth implant system, a ring lock may be used, securely placed in a ring-lock groove located on the lower abutment section. An insertion of a screw deeper into the lower abutment receptacle pushes the ring lock-groove and the ring lock outwardly to force the elastic member against an inner chamber wall of the upper abutment and into the abutment groove to better securely affix the elastic member.

20 Claims, 13 Drawing Sheets

(56) References Cited

U.S. PATENT DOCUMENTS

| | | | |
|---|---|---|---|
| 9,918,809 B2 * | 3/2018 | Piasini | A61C 8/0086 |
| 11,446,121 B2 * | 9/2022 | Siegmund | A61C 8/0053 |
| 11,510,762 B2 * | 11/2022 | Glueck | A61C 13/2656 |
| 11,602,416 B2 * | 3/2023 | Zipprich | A61C 8/0069 |
| 2002/0177103 A1 * | 11/2002 | Pelak | A61C 13/2656 |
| | | | 433/169 |
| 2003/0224328 A1 * | 12/2003 | Sapian | A61C 8/0086 |
| | | | 433/173 |
| 2004/0234925 A1 * | 11/2004 | Benhamou | A61C 8/0086 |
| | | | 433/173 |
| 2006/0228672 A1 * | 10/2006 | Hurson | A61C 8/0066 |
| | | | 433/173 |
| 2010/0266985 A1 * | 10/2010 | Yau | A61C 8/005 |
| | | | 433/173 |
| 2011/0244424 A1 * | 10/2011 | Mehrhof | A61C 8/005 |
| | | | 433/173 |
| 2012/0264082 A1 * | 10/2012 | Segura | A61C 8/0075 |
| | | | 433/174 |
| 2014/0212842 A1 * | 7/2014 | Arnetzl | A61C 8/0068 |
| | | | 433/173 |
| 2014/0363788 A1 * | 12/2014 | Ouellette | A61C 8/0024 |
| | | | 433/201.1 |
| 2015/0093718 A1 * | 4/2015 | Schrank | A61C 8/0048 |
| | | | 433/199.1 |
| 2015/0351877 A1 * | 12/2015 | Boehm | A61C 8/0069 |
| | | | 433/173 |
| 2017/0367796 A1 * | 12/2017 | Dürr | A61C 8/0022 |
| 2019/0133720 A1 * | 5/2019 | Kim | A61C 8/0063 |
| 2023/0263602 A1 * | 8/2023 | Kim | A61C 8/0086 |
| | | | 433/173 |

* cited by examiner

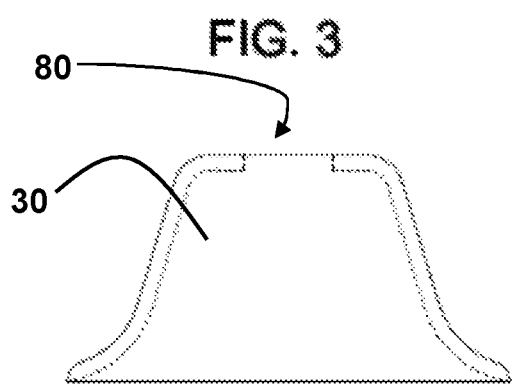
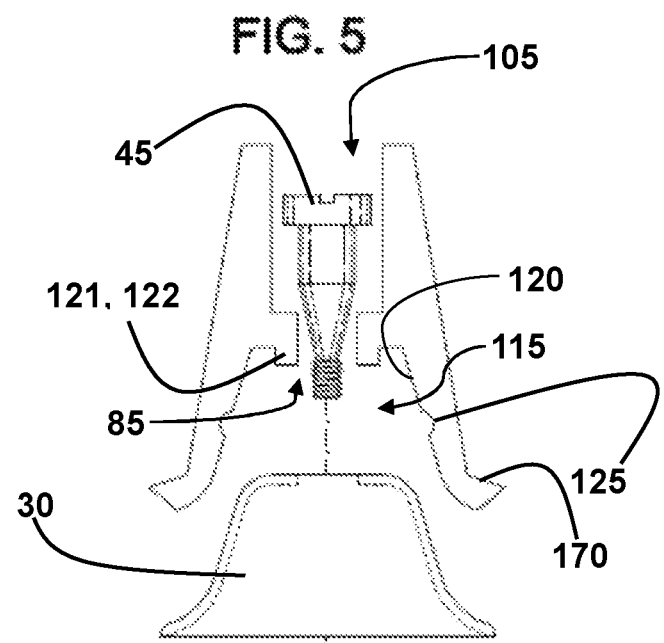
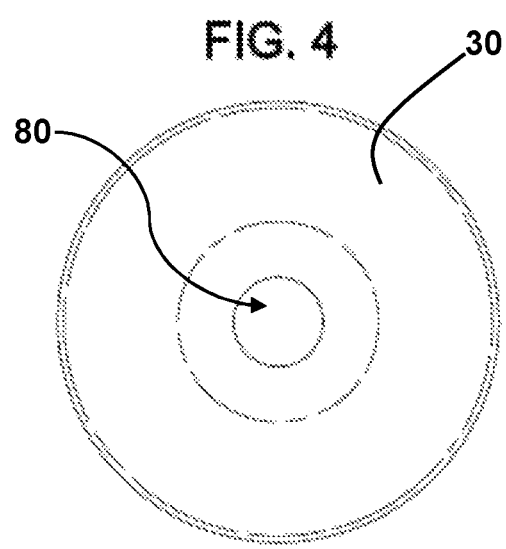
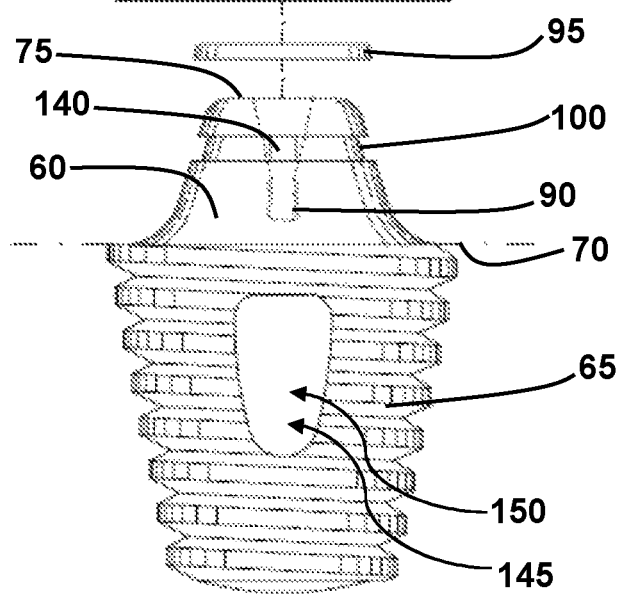

FIG. 6
FIG. 7
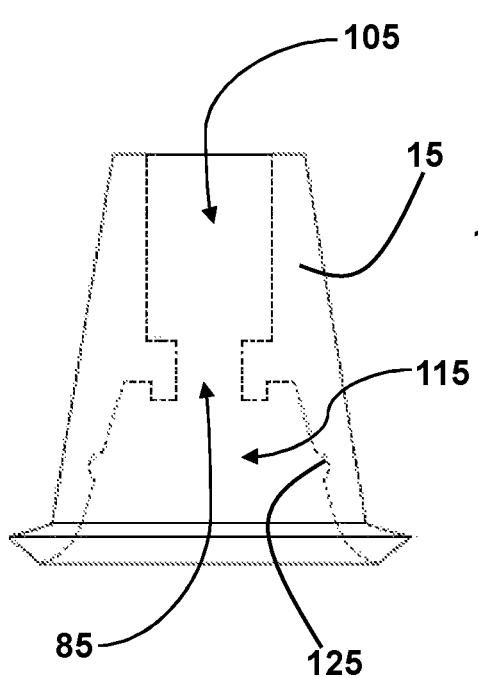
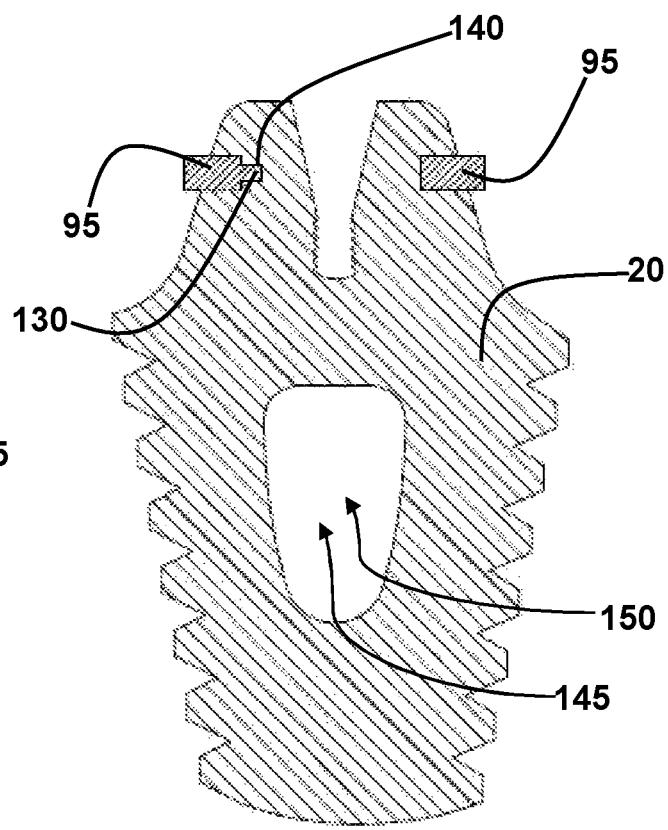

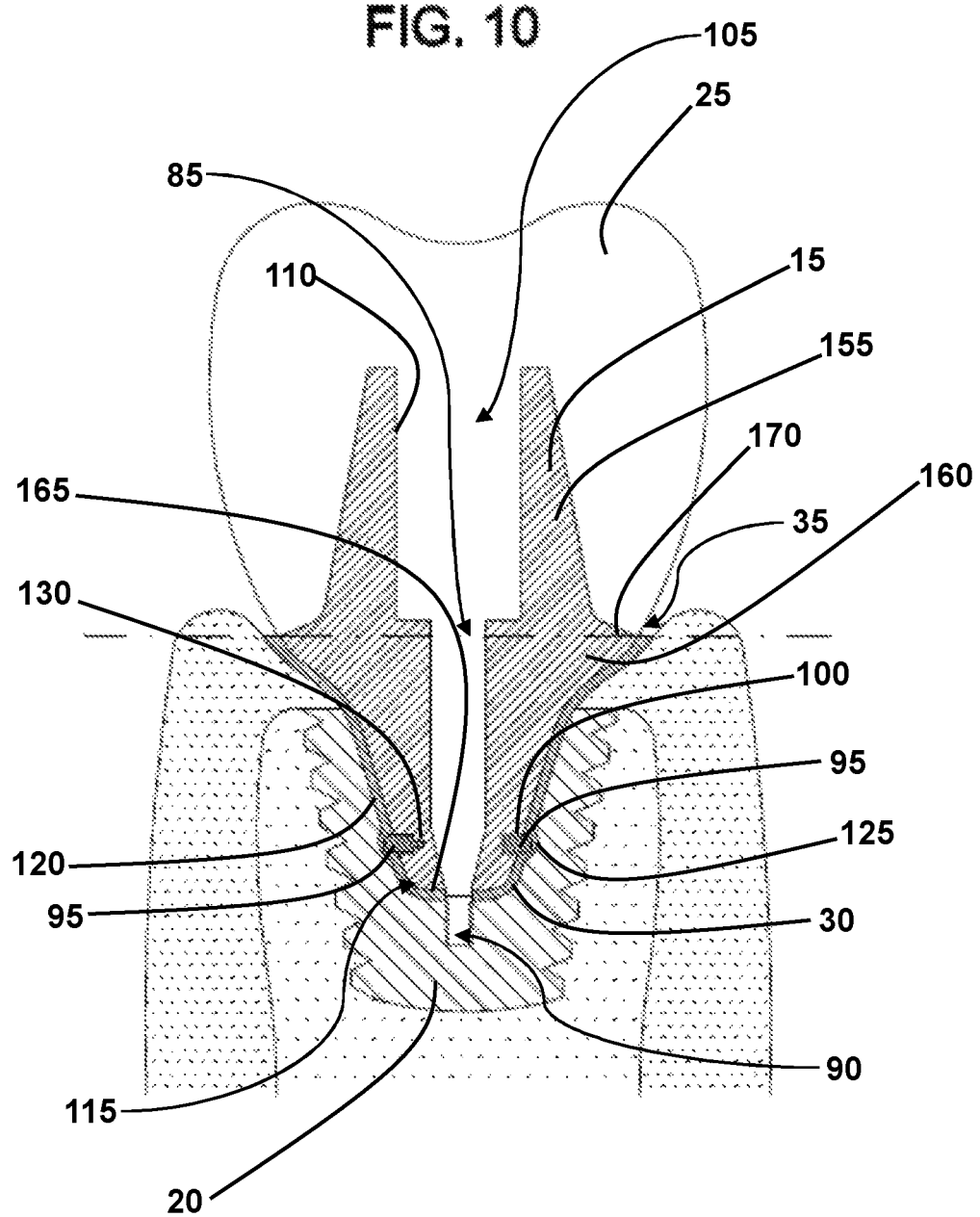

TOOTH IMPLANT SYSTEM

In the conventional tooth implant systems, the fixture and the abutment are fixed to each other through an inclined surface in the fixture, a hex structure preventing rotation, a screw structure for fixing the abutment. Thus, the mechanical stress from the abutment is dispersed at the top portion of the fixture without any dampening or cushioning. Such mechanical stress at the top portion of the fixture caused many problems to the alveolar bone and the abutment screw.

That is, the abutment could be collapsed downwards, and the abutment screw could get loosened, and in certain situations, the fixture can be damaged. Moreover, in certain serious situations, damage to the bone surrounding the implant may be damaged from continuous chewing and grinding of teeth.

Accordingly, the need for a tooth implant system has been present for a long time to soften the impact within the tooth implant system and to the bones.

SUMMARY

A tooth implant system is disclosed herein. The tooth implant system has an upper abutment, a lower abutment, a crown, and an elastic member. The elastic member is securely placed between the upper abutment and the lower abutment providing softer and elastic, yet resilient, cushion between the upper abutment and the lower abutment. The elastic member may be exposed between a gap between the upper abutment and the lower abutment. The elastic member may even protrude out slightly, or bulge out slightly, between the upper abutment and the lower abutment, so no food particle may be trapped between the upper abutment and the lower abutment.

The elastic member may be designed to be approximately the same shape and size as the in-between space between the upper abutment and the lower abutment. However, it is possible to have the elastic member to be a flatter shape that is pliable to fit into the in-between space between the upper abutment and the lower abutment, screwed down with a screw to bulge out of the gap between the upper abutment and the lower abutment. In this configuration, the elastic member may be trimmed along the gap to make the elastic member smoothly aligned with the upper abutment and the lower abutment. The elastic member may be made of plastic, rubber, gold, or other elastic materials commonly used in dentistry. Also, the elastic member may be made of stretchable material, formed as a pliable disc, so that when the elastic member is inserted in between the upper abutment and the lower abutment, the elastic member stretches and tightly fits into a hollow area between the upper abutment and the lower abutment.

The lower abutment has a lower-abutment section and a fixture section. The crown securely attaches to the upper abutment, and the fixture section securely implants into to a patient's bone. A transition line is formed between the lower-abutment section and the fixture section. The circumference of the transition line of the lower abutment has a wider diameter than a narrower diameter located at the lower-abutment section sloping upwards to an upper-lower abutment surface, forming a sloping surface of the lower-abutment section.

The elastic member has an elastic-member hole aligned with an upper-abutment hole of the upper abutment and a lower-abutment receptacle of the lower abutment has. A screw, a threaded bolt, or other frictional securing means is used to securely affix the upper abutment to the lower abutment. As an example, a screw inserted and screwed tightly into the upper-abutment hole, the elastic-member hole, and into the lower-abutment receptacle.

To better affix the elastic member within the tooth implant system, a ring lock may be used. The ring lock may be securely placed in a ring-lock groove located on the sloping surface of the lower abutment section.

The upper abutment has an upper chamber with an upper-chamber wall, and a lower chamber with a lower-chamber wall. The sloping surface of the lower abutment section and the elastic member fits into the lower chamber. A screw slightly larger than the lower abutment receptacle is used so that the insertion of the screw deeper into the lower abutment receptacle pushes the ring-lock groove and the ring lock outwardly to force fit the elastic member against the lower-chamber wall of the upper abutment, allowing the gap to be completely sealed (covered) by the elastic member so that no food particle may be lodged in the gap.

The lower-chamber wall of the upper abutment has an abutment groove that receives a pushed-out portion of the elastic member when the screw is inserted and screws into the lower abutment receptacle. The insertion of the screw deeper into the lower abutment receptacle pushes the ring lock-groove and the ring lock outwardly to force the elastic member against the inner chamber wall of the upper abutment and into the abutment groove. The ring lock may have one or more ring protrusions extended from the inner ring that fit into one or more pits on the ring lock-groove.

The tooth implant system may have the fixture section of the lower abutment having an indentation so that the bone of the patient would grow into the indentation after the tooth implant system is implanted in the patient. The indentation can be designed as a pass-through hole in the fixture section so that the bone of the patient would grow into the indentation after the tooth implant system is implanted in the patient.

A second version of the tooth implant system is also presented. The tooth implant system has an upper abutment, a lower abutment, a crown, and an elastic member. The elastic member is securely placed between the upper abutment and the lower abutment, and the crown is placed securely to the upper abutment. The entire tooth implant system is rooted into a patient's bone when the lower abutment is implanted into to the patient's bone.

The elastic member may be exposed between a gap between the upper abutment and the lower abutment. The elastic member may even protrude out slightly, or bulge out slightly, between the upper abutment and the lower abutment, so no food particle may be trapped between the upper abutment and the lower abutment.

The elastic member has an elastic-member hole aligned with an upper-abutment hole of the upper abutment and a lower-abutment receptacle of the lower abutment has. A screw, a threaded bolt, or other frictional securing means is used to securely affix the upper abutment to the lower abutment. As an example, a screw inserted and screwed tightly into the upper-abutment hole, the elastic-member hole, and into the lower-abutment receptacle.

The upper abutment has an upper-abutment section and a lower-upper-abutment section. A transition line is formed between the upper-abutment section and the lower-upper-abutment section of the upper abutment. The lower-upper-abutment section has a sloping surface sloping upwards from a smaller diameter at a lower-upper-abutment surface to a wider diameter at the transition line.

The upper abutment has an upper chamber with an upper-chamber wall. The lower abutment has a lower chamber with a lower-chamber wall. As an improvement a ring lock may be used by placing the ring lock on a ring-lock groove to hold the ring lock in place at the sloping surface of the lower-upper abutment section.

The sloping surface of the lower-upper abutment section and the elastic member fits into the lower chamber. The screw is used to securely hold the upper abutment, the elastic member, and the lower abutment together. The screw should be slightly larger than the lower abutment receptacle and the upper abutment hole so that the insertion of the screw deeper into the lower abutment receptacle pushes the ring-lock groove and the ring lock outwardly to force the elastic member against the lower-chamber wall of the lower abutment.

The lower-chamber wall of the lower abutment has an abutment groove that receives a pushed-out portion of the elastic member when the screw is inserted and screws into the lower abutment receptacle. The insertion of the screw deeper into the lower abutment receptacle pushes the ring-lock groove and the ring lock outwardly to force the elastic member against the lower-chamber wall of the lower abutment and into the abutment groove.

One option for the tooth implant system is to have the elastic member made of elastic and stretchable material, formed as a pliable disc, so that when the elastic member is inserted in between the upper abutment and the lower abutment, the elastic member stretches and tightly fits into a hollow area between the upper abutment and the lower abutment.

Another option for the tooth implant system is to have an indentation on the lower abutment so that the bone of the patient grows into the indentation after the tooth implant system is implanted in the patient. Moreover, the indentation may be a pass-through hole in the lower abutment section so that the bone of the patient would grow into the indentation after the tooth implant system is implanted in the patient. Furthermore, the ring lock may have one or more ring protrusions extended from the inner ring that fit into one or more pits on the ring-lock groove.

These and other features, aspects, and advantages of the tooth implant system will become better understood with reference to the accompanying specification, writing, drawings, and submission, all of which are incorporated herein.

BRIEF DESCRIPTION OF THE DRAWINGS

These and other features, aspects, and advantages of the improved tooth implant system will become better understood with reference to the accompanying drawings, wherein:

FIG. 3 is a view of the elastic member,

FIG. 4 is a top view of the elastic member,

FIG. 5 is an exploded view of the tooth implant system,

FIG. 6 is a view of the upper abutment of an embodiment of the tooth implant system, FIG. 7 is a view of the lower abutment of an embodiment of the tooth implant system, FIG. 10 is a cross-sectional view of a second embodiment of the tooth implant system.

DETAILED DESCRIPTION EMBODIMENTS OF THE INVENTION

A tooth implant system 10 is described in detail, as shown in FIGS.

Figure 1:
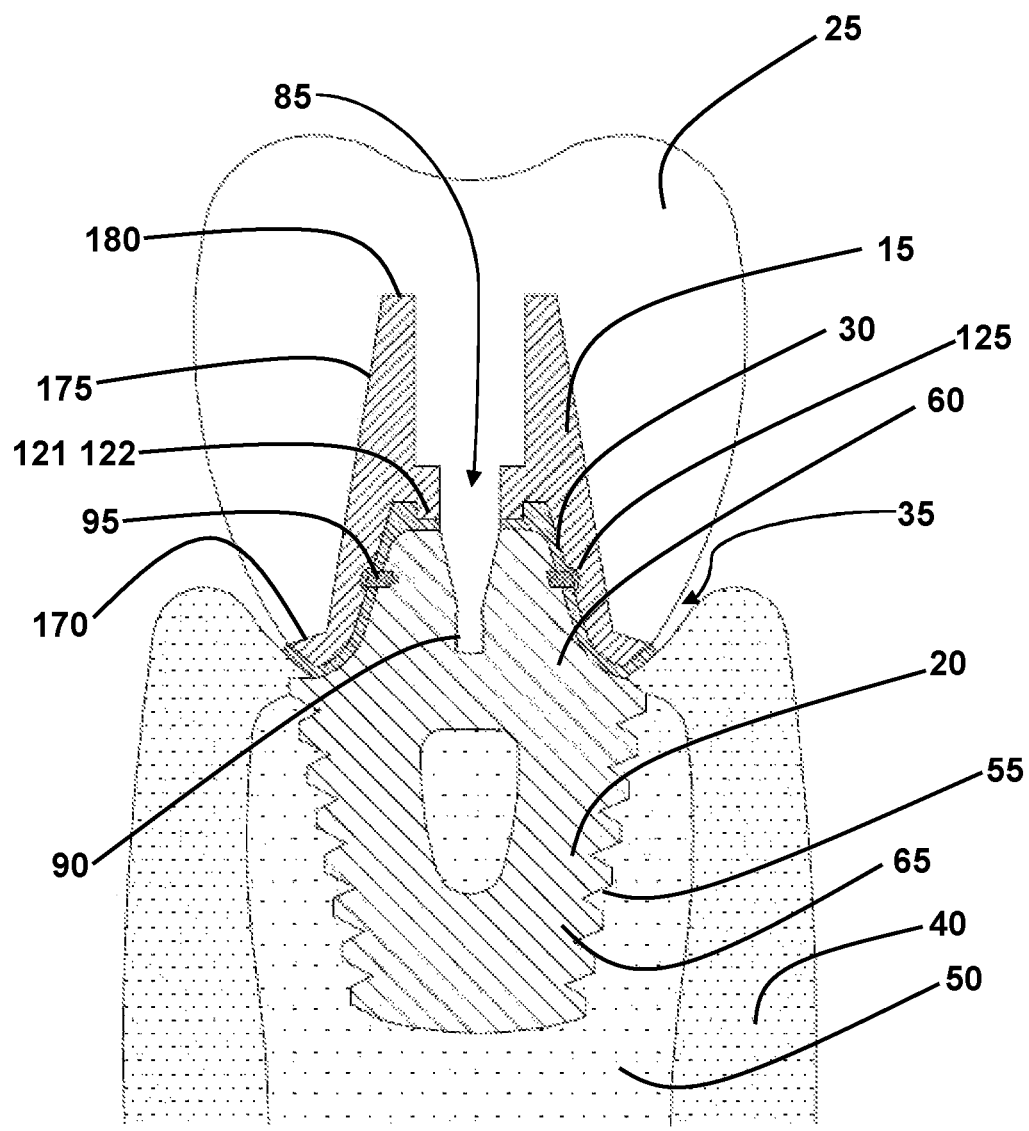
FIG. 1 is a cross-sectional view of the tooth implant system.

FIG. 1 shows a cross-sectional view of the tooth implant system 10 having an upper abutment 15, a lower abutment 20, a crown 25, and an elastic member 30. The elastic member 30 is securely placed between the upper abutment 15 and the lower abutment 20 providing softer and elastic, yet resilient, cushion between the upper abutment 15 and the lower abutment 20. The elastic member 30 may be exposed between a gap 35 between the upper abutment 15 and the lower abutment 20 in between the crown 25 and gum 40, the user's gum 40. The elastic member 30 may even protrude out slightly, or bulge out slightly, between the upper abutment 15 and the lower abutment 20, so no food particle may be trapped between the upper abutment 15 and the lower abutment 20.

Figure 12:
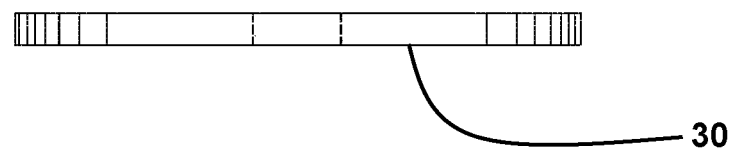
FIG. 12 is a side view of one possible embodiment of the elastic member.
Figure 13:
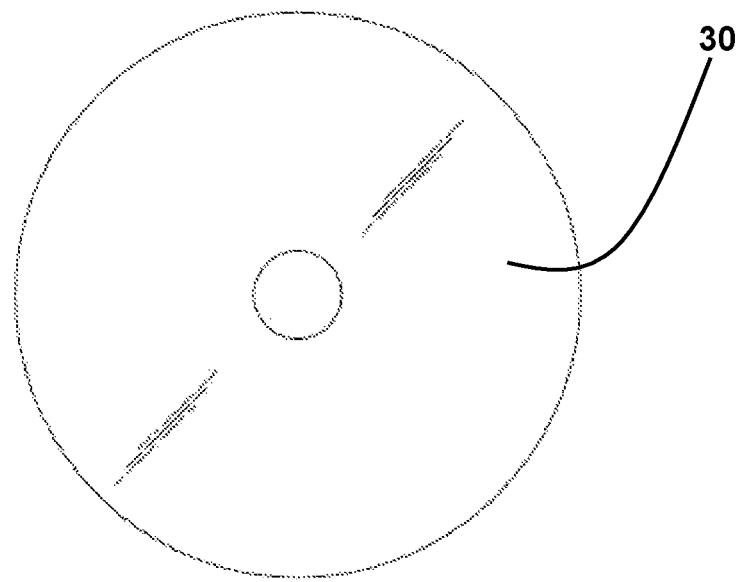
FIG. 13 is a top view of one possible embodiment of the elastic member.

The elastic member 30 may be designed to be the same size or substantially (approximately) the same shape and size as the in-between space between the upper abutment 15 and the lower abutment 20, as shown in FIG. 3. However, it is possible to have the elastic member 30 to be a flatter shape, as shown in FIGS. 12-13, that is pliable to fit into the in-between space between the upper abutment 15 and the lower abutment 20, screwed down with a screw 45 (seen in FIG. 5) to bulge out of the gap 35 between the upper abutment 15 and the lower abutment 20. In this configuration, the elastic member 30 would need to be substantially more pliable than a pre-formed shape and would need be trimmed along the gap 35 to make the elastic member 30 smoothly aligned with the upper abutment 15 and the lower abutment 20.

A preferred shape of the elastic member 30, as seen in FIG. 3, is the elastic member 30 designed to be approximately the same shape and size as the in-between space between the upper abutment 15 and the lower abutment 20. The actual shape of the elastic member 30 shaped as a generally flatter shape pliable to fit into the in-between space between the upper abutment 15 and the lower abutment 20 will vary pending the material used for the elastic member 30. In general, the elastic member 30 should be made of plastic, rubber, gold, or other elastic materials commonly used in dentistry. Also, the elastic member 30 may be made of material, formed as a pliable disc, so that when the elastic member is inserted in between the upper abutment 15 and the lower abutment 20, the elastic member stretches and tightly fits into (or forms into) a hollow area between the upper abutment 15 and the lower abutment 20.

The lower abutment 15 is securely screwed into the user's bone 50 using a threaded surface 55 of the lower abutment 15. Although the threaded surface 55 in FIG. 1 is shown in a wide format, the threaded surface 55 of the lower abutment 15 may have various shapes, including but not limited to, much narrow format to better fit limited width of the bone 50.

Figure 2:
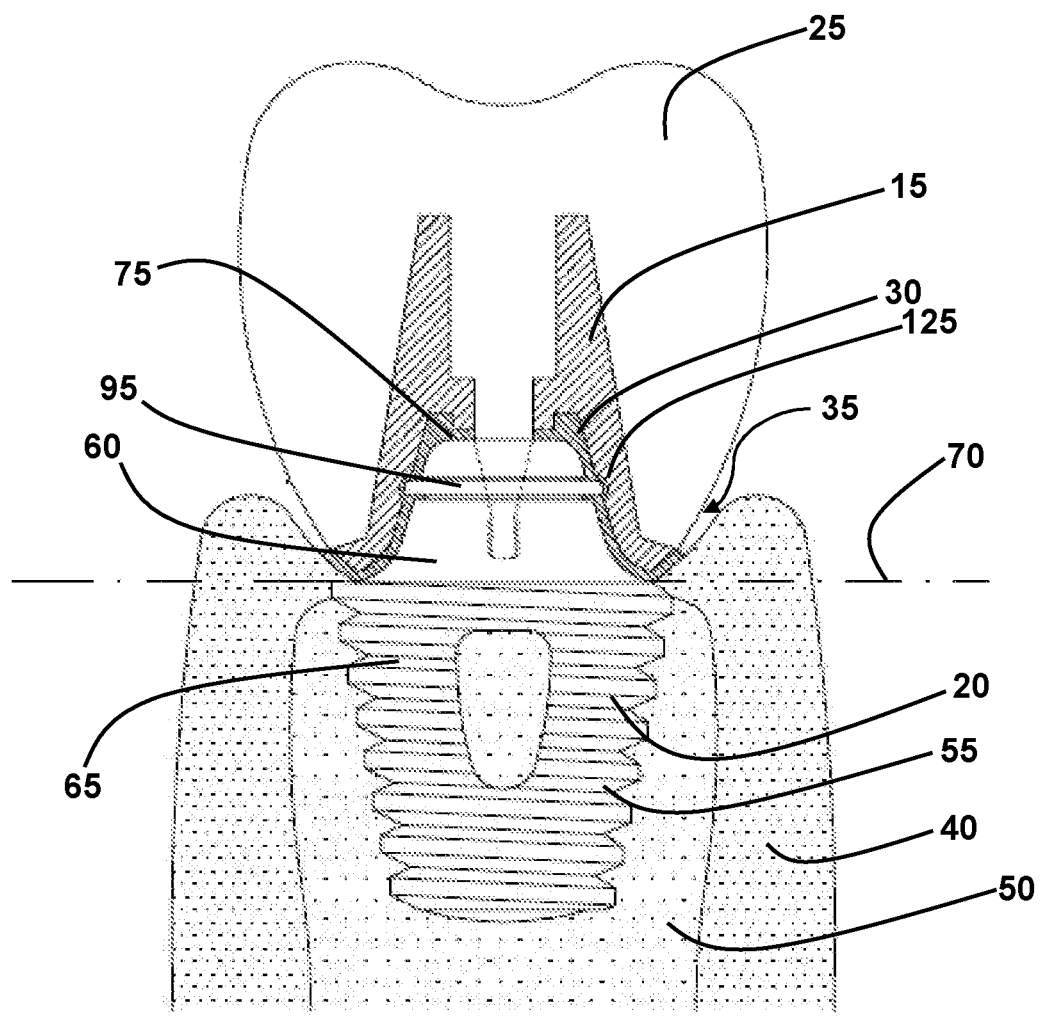
FIG. 2 is a view of the tooth implant system.

FIG. 2 shows the tooth implant system 10 having an upper abutment 15, a lower abutment 20, a crown 25, and an elastic member 30. To better illustrate the details of the lower abutment 20, the upper abutment 15 and the crown are shown in their cross-sectional views.

As with FIG. 1, FIG. 2 shows the elastic member 30 securely placed between the upper abutment 15 and the lower abutment 20, providing softer and elastic, yet resilient, cushion between the upper abutment 15 and the lower abutment 20. The elastic member 30 is shown exposed between a gap 35 between the upper abutment 15 and the lower abutment 20 in between the crown 25 and gum 40, the user's gum 40.

The lower abutment 20 has a lower-abutment section 60 and a fixture section 65. The crown 25 securely attaches to the upper abutment 15, and the fixture section 65 securely implants into to a patient's bone 50. A transition line 70 is formed between the lower-abutment section 60 and the fixture section 65. The transition line is located on the lower abutment 20 located at near the gap 35 between the upper abutment 15 and the lower abutment 20. The transition line, although it is not physically marked on the lower abutment 20, it is the transition between the lower-abutment section 60 and the fixture section 65, identifiable by the transition of sloping from the lower-abutment section 60 and the fixture section 65. The circumference of the transition line 70 of the lower abutment 20 has a wider diameter than a narrower diameter located at the lower-abutment section 60 sloping upwards to an upper-lower abutment surface 75, forming a sloping surface of the lower-abutment section 60.

FIGS. 3-5 show the elastic member 30 having an elastic-member hole 80 aligned with an upper-abutment hole 85 of the upper abutment 15 and a lower-abutment receptacle 90 of the lower abutment 20. A screw 45, a threaded bolt, or other frictional securing means is used to securely affix the upper abutment 15 to the lower abutment 20. As an example, a screw 45 inserted and screwed tightly into the upper-abutment hole 85, the elastic-member hole 80, and into the lower-abutment receptacle 90.

FIG. 5 is an exploded view of tooth implant system 10 having an upper abutment 15, a lower abutment 20, and an elastic member 30. A ring lock 95 (also reference FIGS. 8A, 8B, 9A and 9B) that may be securely placed in a ring-lock groove 100 located on the sloping surface of the lower abutment section 60 is shown. The ring lock 95 should have an opening break 96 as shown in FIGS. 8A, 8B, 9A, and 9B. The ring lock 95 better affixes the elastic member 30 and securely fastens the elastic member 30 within the tooth implant system 10. Along with FIG. 6, FIG. 5 shows the upper abutment 15 having an upper chamber 105 with an upper-chamber wall 110, and a lower chamber 115 with a lower-chamber wall 120.

The sloping surface of the lower abutment section 60 and the elastic member 30 fits into the lower chamber 115. A screw 45 slightly larger than the lower-abutment receptacle 90 is used so that the insertion of the screw 45 deeper into the lower-abutment receptacle 90 pushes into the ring-lock groove 100 and the ring lock 95 outwardly to force fit the elastic member 30 against the lower-chamber wall 120 of the upper abutment 15, allowing the gap 35 to be completely sealed (covered and/or filled) by the elastic member 30 so that no food particle may be lodged in the gap 35.

One variation of the tooth implant system 10 has the upper abutment having a post 121 (also shown in FIG. 1) below an upper abutment hole 85 so that the post 121 presses down on the elastic member 30 when the screw secures the upper abutment 15, the elastic member 30, and the lower abutment 20. The post 121 may form a press-down wall 122 along the upper abutment hole 85 (also shown in FIG. 1).

As shown in FIGS. 1-2 and 5-6, the lower-chamber wall 120 of the upper abutment 15 has an abutment groove 125 that receives a pushed-out portion of the elastic member 30 when the screw 45 is inserted and screws into the lower abutment receptacle 90. The insertion of the screw 45 deeper into the lower abutment receptacle 90 pushes the ring lock-groove 100 and the ring lock 95 outwardly to force the elastic member 30 against the inner chamber wall 110 (upper-chamber wall) of the upper abutment 15 and into the abutment groove 125.

Figures 8A, 8B:
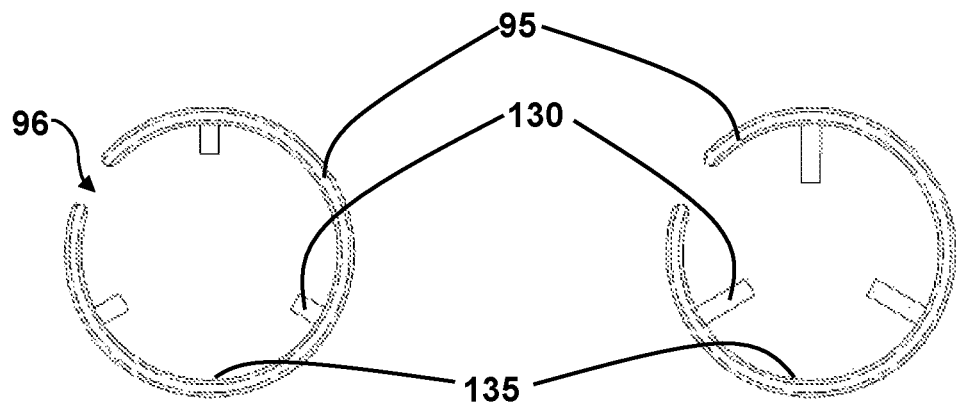
FIG. 8A is a top view of the ring lock.
FIG. 8B is a top view of a different version of the ring lock.
Figures 9A, 9B:
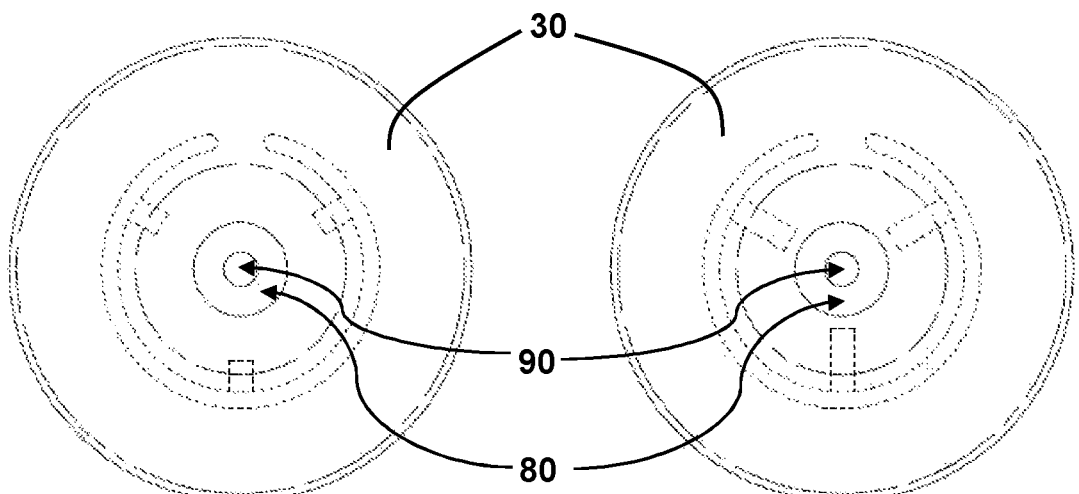
FIG. 9 is a top view of the elastic member with the ring lock in the lower abutment.
Figure 11:
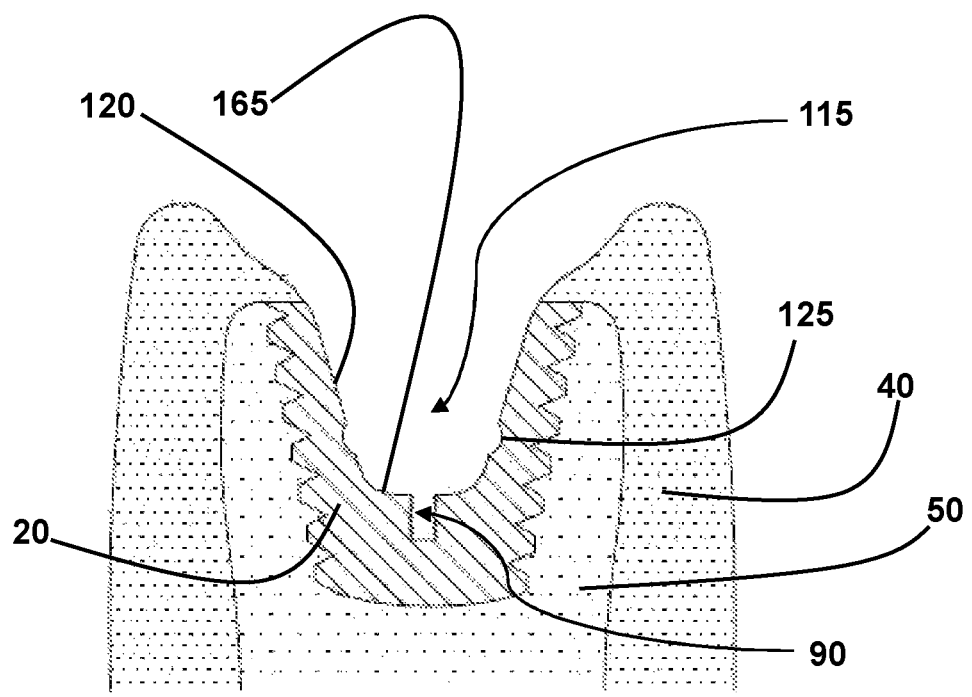
FIG. 11 is a view of the lower abutment of the second embodiment of the tooth implant system.

As shown in FIGS. 8A, 8B, 9A, and 9B, the ring lock 95 with the opening break 96 may have one or more ring protrusions 130 (also shown in FIG. 7) extended from the inner ring 135 (that is, the inside of the ring lock 95) that fit into one or more pits 140 (also shown in FIGS. 5 and 7) on the ring lock-groove 100. FIG. 9 is a top view of the elastic member 30 with the ring lock 95 in the lower abutment 20. The lower abutment is shown by hidden lines because the lower abutment in these FIGS. are covered over by the elastic member 30. FIGS. 8B and 9B show the ring protrusions 130 longer than the ones shown in FIGS. 8A and 8B. The longer ring protrusions 130 as shown in FIGS. 8B and 9B extend through the pits 140 (through the pits 140 that extend as a tube to the lower-abutment receptacle 90) and contact the screw 45 so when the screw 45 is securely screwed into the lower-abutment receptacle 90, the screw itself pushes the ring protrusion 130 outward and forces the elastic member into the abutment groove 125. The pits 140 may be fully bored through the lower abutment 20 to accommodate the longer ring protrusions 130 as shown in FIGS. 8B and 9B, illustrated in FIGS. 15 and 16.

As seen in FIG. 5, the tooth implant system 10 may have the fixture section 65 of the lower abutment 20 having an indentation 145 so that the bone 50 of the patient would grow into the indentation 145 after the tooth implant system 10 is implanted in the patient. The indentation 145 can be designed as a pass-through hole 150 in the fixture section so that the bone of the patient would grow into the indentation after the tooth implant system 10 is implanted in the patient.

FIG. 10 shows a second version of the tooth implant system 10. The tooth implant system 10 has an upper abutment 15, a lower abutment 20, a crown 25, and an elastic member 30. The elastic member 30 is securely placed between the upper abutment 15 and the lower abutment 20, and the crown 25 is placed securely to the upper abutment 15. The entire tooth implant system 10 is rooted into a patient's bone 50 when the lower abutment 20 is implanted into to the patient's bone 50.

The elastic member 30 may be exposed between a gap 35 between the upper abutment 15 and the lower abutment 20. The elastic member 30 may even protrude out slightly, or bulge out slightly, between the upper abutment 15 and the lower abutment 20, so no food particle may be trapped between the upper abutment 15 and the lower abutment 20.

The elastic member 30 has an elastic-member hole 80 aligned with an upper-abutment hole 85 of the upper abutment 15 and a lower-abutment receptacle 90 of the lower abutment 20. In this configuration, the upper-abutment hole 85 is extended longer than the upper-abutment hole 85 of the previous configuration of the elastic member 30 presented above.

A screw 45, a threaded bolt, or other frictional securing means is used to securely affix the upper abutment 15 to the lower abutment 20. As an example, a screw 45 inserted and screwed tightly into the upper-abutment hole 85, the elastic-member hole 80, and into the lower-abutment receptacle 90.

The upper abutment 15 has an upper-abutment section 155 and a lower-upper-abutment section 160. A transition line 70 is formed between the upper-abutment section 150 and the lower-upper-abutment section 160 of the upper abutment 15. The lower-upper-abutment section 160 has a sloping surface sloping upwards from a smaller diameter at a lower-upper-abutment surface 165 to a wider diameter at the transition line 70.

The upper abutment 15 has an upper chamber 105 with an upper-chamber wall 110. The lower abutment 20 has a lower chamber 115 with a lower-chamber wall 120. As an improvement a ring lock 95 may be used by placing the ring lock 95 on a ring-lock groove 100 to hold the ring lock 95 in place at the sloping surface of the lower-upper abutment section 155.

The sloping surface of the lower-upper abutment section 155 and the elastic member 30 fits into the lower chamber 115. The screw 45 is used to securely hold the upper abutment 15, the elastic member 30, and the lower abutment 20 together. The screw 45 should be slightly larger than the lower abutment receptacle 90 and the upper abutment hole 85 so that the insertion of the screw 45 deeper into the lower abutment receptacle 90 pushes the ring-lock groove 100 and the ring lock 95 outwardly to force the elastic member 30 against the lower-chamber wall 120 of the lower abutment 20.

The lower-chamber wall 120 of the lower abutment 20 has an abutment groove 125 that receives a pushed-out portion of the elastic member 30 when the screw 45 is inserted and screws into the lower abutment receptacle 90. The insertion of the screw 45 deeper into the lower abutment receptacle 90 pushes the ring-lock groove 100 and the ring lock 95 outwardly to force the elastic member 30 against the lower-chamber wall 120 of the lower abutment 20 and into the abutment groove 125.

FIG. 12 is a side view of one possible embodiment of the elastic member 30, and FIG. 13 is a top view of one possible embodiment of the elastic member 30. As illustrated by FIGS. 12-13, the elastic member 30 may have various forms and shapes, including but not limited to the shapes shown in the FIGS. because the elastic member 30 is elastic. As an example, the elastic member 30 may have an oval shape, an elliptical shape, a convex shape, or a concave shape.

Figure 14:
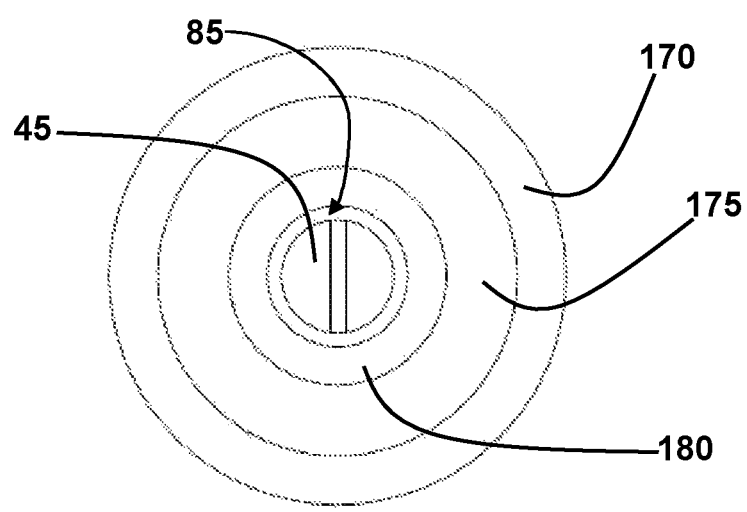
FIG. 14 is a top view of the upper abutment showing a screw inserted into the upper-abutment hole.

FIG. 14 shows a top view of the upper abutment 15 showing a screw 45 inserted into the upper-abutment hole 85. FIG. 14 also shows a crown-mounting ledge 170 on which the crown mounts, an outer-surface 175 of the upper abutment 15, and a top-surface 180 of the upper abutment. The crown-mounting ledge 170, the outer-surface 175 of the upper abutment 15, and the top-surface 180 of the upper abutment are also shown in FIG. 1 and other FIGS.

Figure 15:
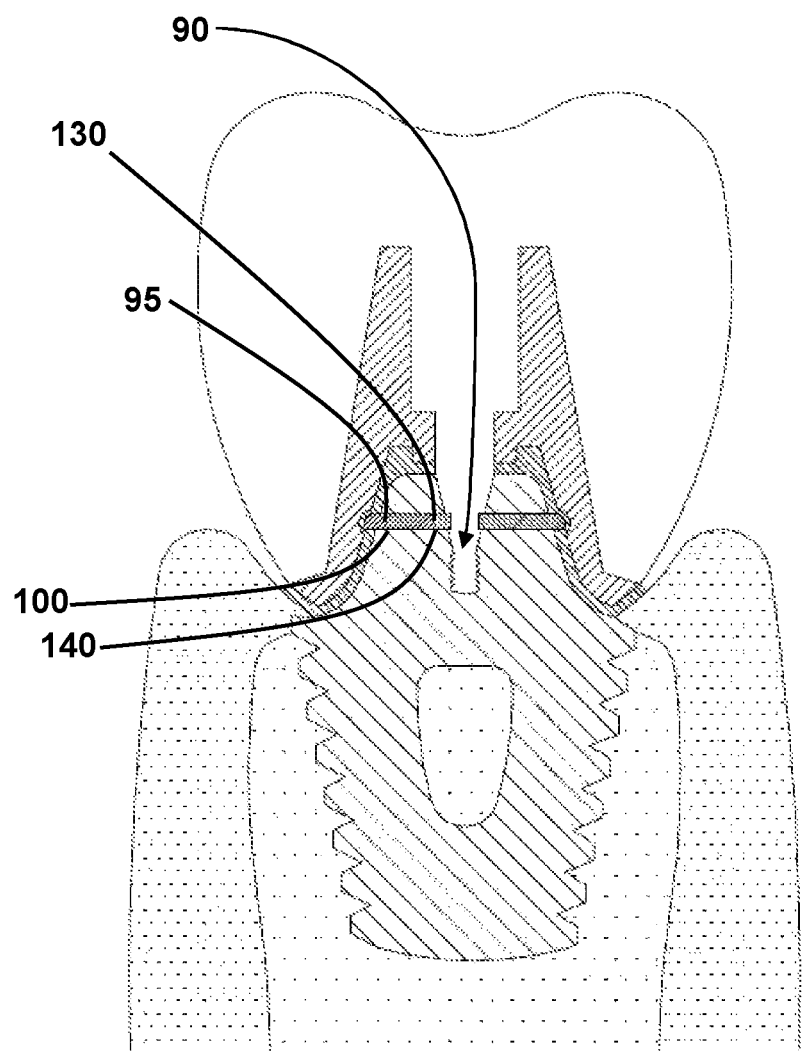
FIG. 15 is a cross-sectional view of one version of the tooth implant system showing the ring protrusion reaching the lower-abutment receptacle.
Figure 16:
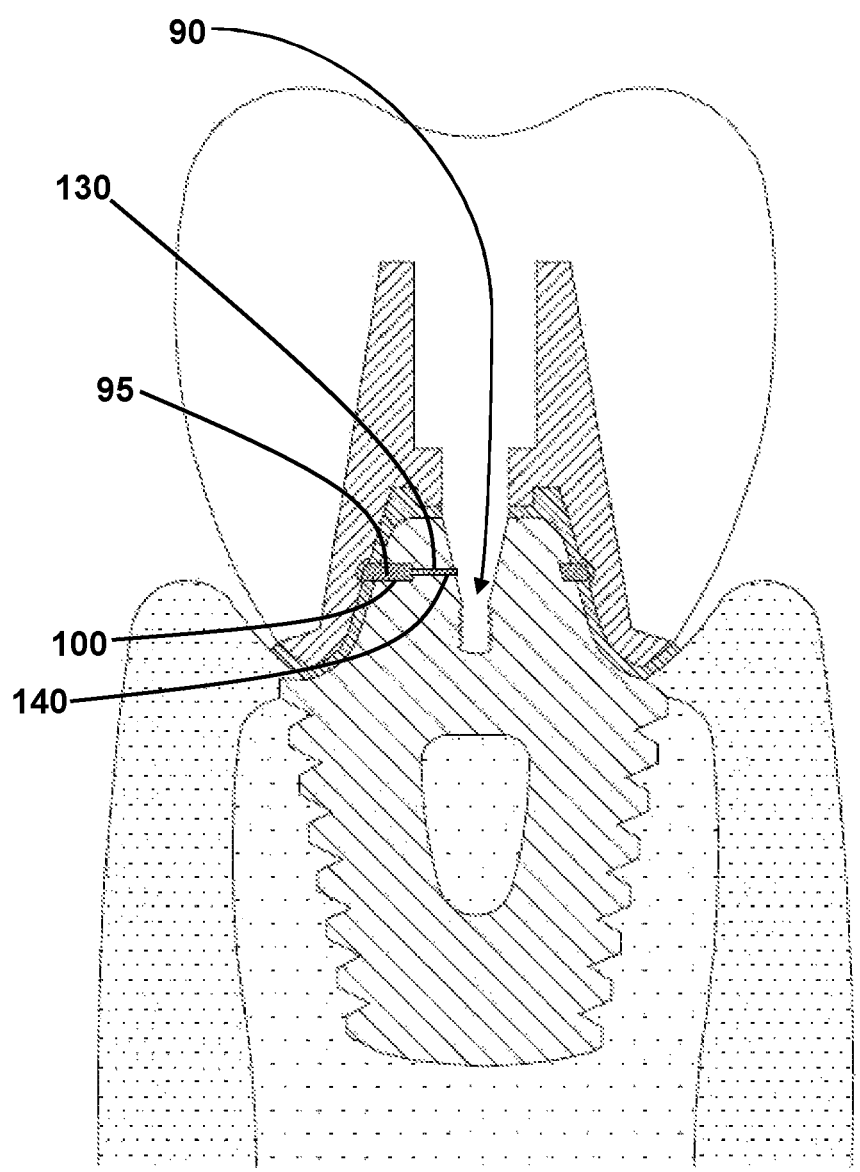
FIG. 16 is another cross-sectional view of one version of the tooth implant system showing the ring protrusion reaching the lower-abutment receptacle.

FIGS. 15-16 are two cross-sectional views of two versions of the tooth implant system 10 showing the ring protrusion 130 reaching the lower-abutment receptacle 90. As illustrated in FIGS. 8B and 9B show the ring protrusions 130 longer than the ones shown in FIGS. 8A and 8B. The longer ring protrusions 130 as shown in FIGS. 8B and 9B extend through the pits 140 (through the pits 140 that extend as a hollow tube to the lower-abutment receptacle 90) and contact the screw 45 so when the screw 45 is securely screwed into the lower-abutment receptacle 90, the screw itself pushes the ring protrusion 130 outward and forces the elastic member into the abutment groove 125. The pits 140 may be fully bored through the lower abutment 20 to accommodate the longer ring protrusions 130 as shown in FIGS. 8B and 9B, illustrated in FIGS. 15 and 16.

FIG. 16 is another cross-sectional view of one version of the tooth implant system 10 showing, as in FIG. 15, the ring protrusion 130 reaching the lower-abutment receptacle 90. The difference between the ring protrusion 130 shown in FIG. 15 and FIG. 16 is that the ring protrusion 130 shown in FIG. 15 has the same thickness as that of the ring lock 95, and the ring protrusion 130 shown in FIG. 16 has a smaller thickness than that of the ring lock 95, thus the pit 140 (the tube) needs to be that much narrower.

Figure 17A:
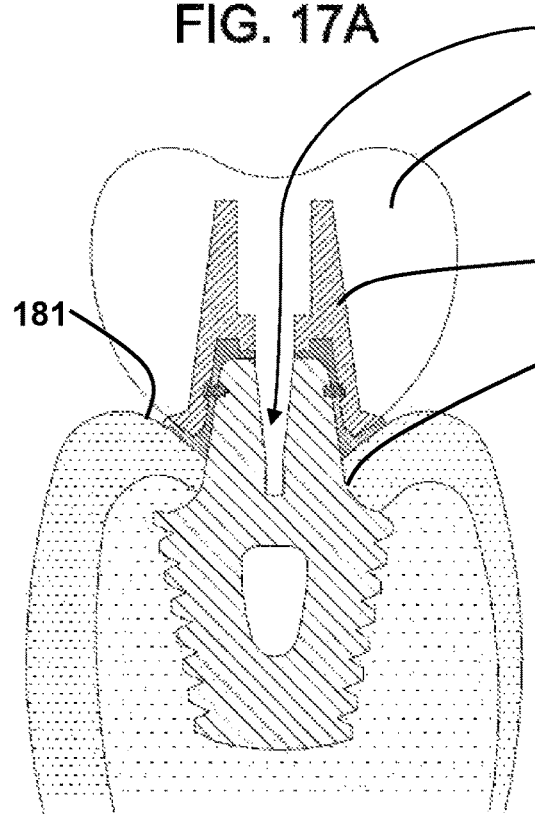
FIGS. 17A-17C are various cross-sectional views of the tooth implant system showing the crown shown in FIG. 17A replaced with the crown shown in FIG. 17C.
Figure 17B:
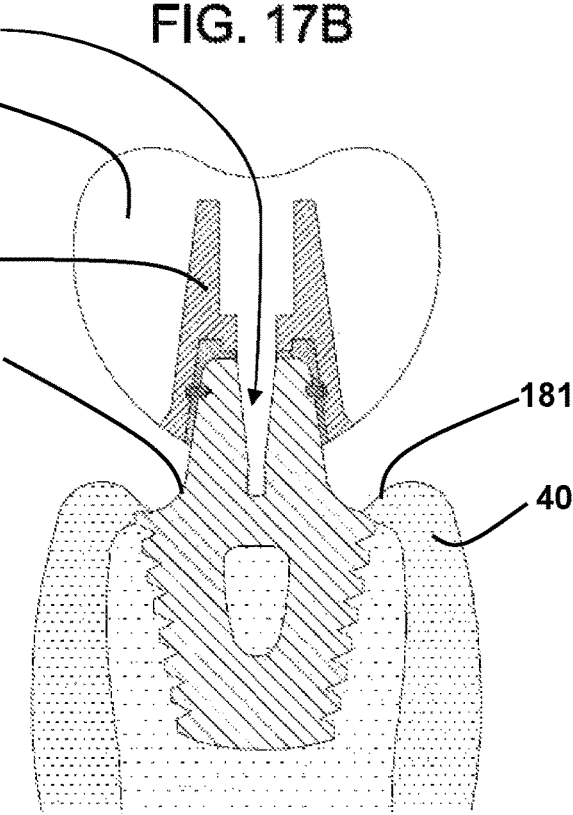
Figure 17C:
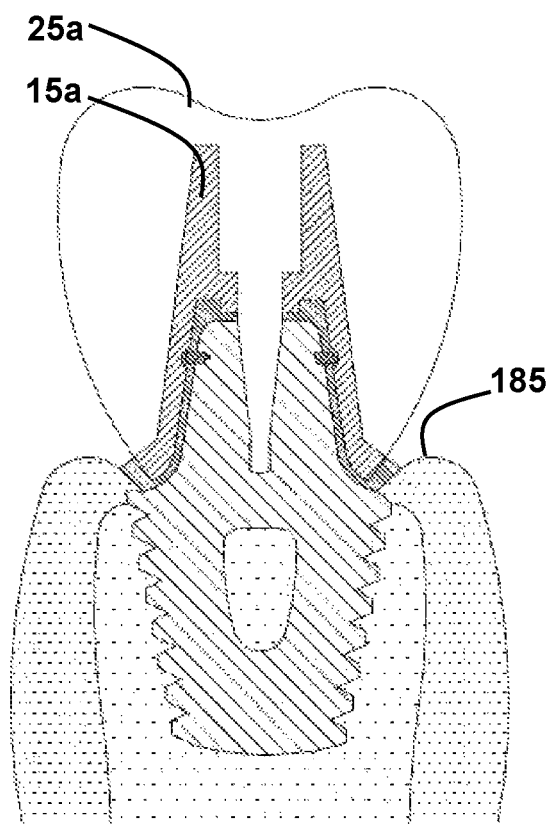

FIGS. 17A-17C are various cross-sectional views of the tooth implant system 10 showing the crown 25 and the upper abutment 15 shown in FIG. 17A replaced with a larger and elongated crown 25a and a larger and elongated upper abutment 15a as shown in FIG. 17C. FIGS. 17A-17C show an advantage of the present tooth implant system 10 over the old conventional tooth implant system. If and when the patient's gumline 181 (gum 40) surrounding an earlier implanted tooth implant system 10, as shown in FIG. 17A, recedes due to age, an extended use, gum disease, or whatever a reason as shown in FIG. 17B, because the lower abutment 20 is initially imbedded deeper than the gum line 181 and an upper surface 185 of the lower abutment 20 is shaped similar as shown in FIGS., the old upper abutment 15 and the old crown 25 can be removed and replaced with a new larger and elongated crown 25a and a new larger and elongated upper abutment 15a as shown in FIG. 17C to fully cover up any exposed lower abutment 20. The new larger and elongated crown 25a and a new larger and elongated upper abutment 15a will be placed at (or aligned with) the gumline 181 as shown, eliminating the need to replace the lower abutment 20 or to disturb the bone 50. It should be noted that a differently shaped upper surface 185 of the lower abutment 20 may also be used.

Figure 18:
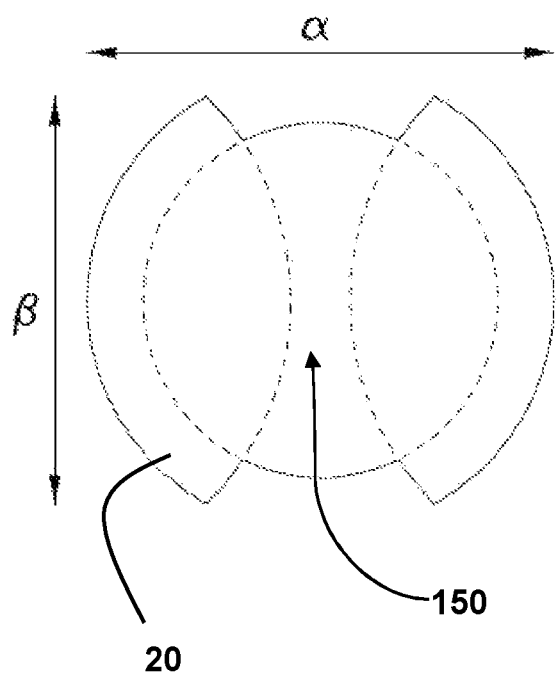
FIG. 18 is a top view of a cross-sectional view of the lower abutment at the pass-through hole.

FIG. 18 is a top view of a cross-sectional view of the lower abutment 20 at the pass-through hole 150. Because the pass-through hole 150 in the lower abutment 20 removes a portion of the lower abutment 20, the width α of the lower abutment 20 is longer than the width β of the lower abutment 20. The width α of the lower abutment 20 is the measure of the full diameter of the lower abutment perpendicular to the pass-through hole 150 and the width β of the lower abutment 20 is the measure of the lower abutment from one end of the pass-through hole 150 to the other. Because the width α is longer than the width β, the cross-section at the pass-through hole 15 is not circular, preventing the tooth implant system 10 from rotating once implanted, making the tooth implant system 10 more securely rooted into the bone 50 when completed. Moreover, because the width β of the lower abutment 20 is narrower than the width a, this version of the tooth implant system 10 may be used where the patient's bone structure is narrow, enabling a broader and stronger implant due to the broader width α along the line of the patent teeth alignment; that is, along the patent bone alignment; the narrower width β of the lower abutment can be set to accommodate the narrower bone structure.

As explained above, one option for the tooth implant system 10 is to have the elastic member 30 made of elastic and stretchable material, formed as a pliable disc, so that when the elastic member 30 is inserted in between the upper abutment 15 and the lower abutment 20, the elastic member 30 stretches and tightly fits into a hollow area between the upper abutment 15 and the lower abutment 20.

While the description, drawings, and references have been presented, shown, and described with reference to different embodiments thereof, it will be appreciated by those skilled in the art that variations in form, detail, compositions, and operation may be made without departing from the spirit and scope of the disclosure.

What is claimed is:

1. A tooth implant system comprising an upper abutment, a lower abutment, a crown, and an elastic member,
   wherein the elastic member is securely placed between the upper abutment and the lower abutment,
   wherein the lower abutment comprises of a lower-abutment section and a fixture section,
   wherein the crown securely attaches to the upper abutment, and the fixture section is adapted to be implanted into a patient's jawbone,
   wherein the elastic member is exposed between a gap between the upper abutment and the lower abutment,
   wherein the elastic member has an elastic-member hole wherein the upper abutment has an upper-abutment hole and the lower abutment has a lower-abutment receptacle,
   wherein the upper abutment securely affixes to the lower abutment with a screw through the upper-abutment hole and the elastic-member hole, into the lower-abutment receptacle,
   wherein the upper abutment has a post below an upper abutment hole so that the post presses down on the elastic member when the screw secures the upper abutment, the elastic member, and the lower abutment,
   wherein the lower-abutment section and the fixture section form a transition line,
   wherein the lower-abutment section has a sloping surface sloping upwards to a narrower diameter at an upper-lower-abutment surface than a wider diameter at the transition line formed between the lower-abutment section and the fixture section,
   wherein the post forms a press-down wall along the upper abutment hole,
   wherein the implant system further comprised of a ring lock,
   wherein the upper abutment has an upper chamber with an upper-chamber wall, and a lower chamber with a lower-chamber wall,
   wherein the sloping surface of the lower abutment section has a ring-lock groove that holds the ring lock in place,
   wherein the sloping surface of the lower abutment section and the elastic member fits into the lower chamber, and
   wherein the screw is larger than the lower abutment receptacle so that the insertion of the screw deeper into the lower abutment receptacle pushes the ring-lock groove and the ring lock outwardly to force the elastic member against the lower-chamber wall of the upper abutment.

2. The tooth implant system of claim 1,
   wherein the lower-chamber wall of the upper abutment has an abutment groove that receives a pushed-out portion of the elastic member when the screw is inserted and screws into the lower abutment receptacle,
   wherein the insertion of the screw deeper into the lower abutment receptacle pushes the ring lock-groove and the ring lock outwardly to force the elastic member against the inner chamber wall of the upper abutment and into the abutment groove.

3. The tooth implant system of claim 2,
   wherein the elastic member is made of stretchable material, formed as a pliable disc, so that when the elastic member is inserted in between the upper abutment and the lower abutment, the elastic member stretches and tightly fits into a hollow area between the upper abutment and the lower abutment.

4. The tooth implant system of claim 1,
   wherein the fixture section of the lower abutment has an indentation so that the bone of the patient would grow into the indentation after the tooth implant system is implanted in the patient.

5. The tooth implant system of claim 4,
   wherein the indentation is a pass-through hole in the fixture section so that the bone of the patient would grow into the indentation after the tooth implant system is implanted in the patient.

6. The tooth implant system of claim 5,
   wherein the ring lock has one or more ring protrusions extended from the inner ring that fit into one or more pits on the ring lock-groove.

7. A tooth implant system comprising an upper abutment, a lower abutment, a crown, and an elastic member,
   wherein the elastic member is securely placed between the upper abutment and the lower abutment,
   wherein the crown securely attaches to the upper abutment, and the lower abutment is adapted to be implanted into a patient's jawbone,
   wherein the elastic member is exposed between a gap between the upper abutment and the lower abutment,
   wherein the elastic member has an elastic-member hole wherein the upper abutment has an upper-abutment hole and the lower abutment has a lower-abutment receptacle,
   wherein the upper abutment securely affixes to the lower abutment with a screw through the upper-abutment hole and the elastic-member hole, into the lower-abutment receptacle,
   wherein the upper-abutment has an upper-abutment section and a lower-upper-abutment section and wherein a transition line is formed between the upper-abutment section and the lower-upper-abutment section,
   wherein the lower-upper-abutment section has a sloping surface sloping upwards from a smaller diameter at a lower-upper-abutment surface to a wider diameter at the transition line,
   wherein the implant system further comprised of a ring lock,
   wherein the upper abutment has an upper chamber with an upper-chamber wall,
   wherein the lower abutment has a lower chamber with a lower-chamber wall,
   wherein the sloping surface of the lower-upper abutment section has a ring-lock groove that holds the ring lock in place, and
   wherein the sloping surface of the lower-upper abutment section and the elastic member fits into the lower chamber.

8. The tooth implant system of claim 7,
   wherein the lower-chamber wall of the lower abutment has an abutment groove that receives a pushed-out portion of the elastic member when the screw is inserted and screws into the lower abutment receptacle, wherein the insertion of the screw deeper into the lower abutment receptacle pushes the ring-lock groove and the ring lock outwardly to force the elastic member against the lower-chamber wall of the lower abutment and into the abutment groove.

9. The tooth implant system of claim 8, wherein the elastic member is made of stretchable material, formed as a pliable disc, so that when the elastic member is inserted in between the upper abutment and the lower abutment, the elastic member stretches and tightly fits into a hollow area between the upper abutment and the lower abutment.

10. The tooth implant system of claim 7, wherein the lower abutment has an indentation so that the bone of the patient would grow into the indentation after the tooth implant system is implanted in the patient.

11. The tooth implant system of claim 10, wherein the indentation is a pass-through hole in the lower abutment section so that the bone of the patient would grow into the indentation after the tooth implant system is implanted in the patient.

12. The tooth implant system of claim 11, wherein the ring lock has one or more ring protrusions extended from the inner ring that fit into one or more pits on the ring-lock groove.

13. The tooth implant system of claim 7, wherein the screw is larger than the lower abutment receptacle and the upper-abutment hole so that the insertion of the screw deeper into the lower abutment receptacle pushes the ring-lock groove and the ring lock outwardly to force the elastic member against the lower-chamber wall of the lower abutment.

14. The tooth implant system of claim 13, wherein the lower-chamber wall of the lower abutment has an abutment groove that receives a pushed-out portion of the elastic member when the screw is inserted and screws into the lower abutment receptacle, wherein the insertion of the screw deeper into the lower abutment receptacle pushes the ring-lock groove and the ring lock outwardly to force the elastic member against the lower-chamber wall of the lower abutment and into the abutment groove.

15. A tooth implant system comprising an upper abutment, a lower abutment, a crown, and an elastic member, wherein the elastic member is securely placed between the upper abutment and the lower abutment, wherein the lower abutment comprises of a lower-abutment section and a fixture section, wherein the crown securely attaches to the upper abutment, and the fixture section is adapted to be implanted into a patient's jawbone, wherein the elastic member is exposed between a gap between the upper abutment and the lower abutment, wherein the elastic member has an elastic-member hole wherein the upper abutment has an upper-abutment hole and the lower abutment has a lower-abutment receptacle, wherein the upper abutment securely affixes to the lower abutment with a screw through the upper-abutment hole and the elastic-member hole, into the lower-abutment receptacle, wherein the upper abutment has a post below an upper abutment hole so that the post presses down on the elastic member when the screw secures the upper abutment, the elastic member, and the lower abutment, Wherein the lower-abutment section and the fixture section form a transition line, wherein the lower-abutment section has a sloping surface sloping upwards to a narrower diameter at an upper-lower-abutment surface than a wider diameter at the transition line formed between the lower-abutment section and the fixture section, wherein the post forms a press-down wall along the upper abutment hole, wherein the implant system further comprised of a ring lock, wherein the upper abutment has an upper chamber with an upper-chamber wall, and a lower chamber with a lower-chamber wall, wherein the sloping surface of the lower abutment section has a ring-lock groove that holds the ring lock in place, and wherein the sloping surface of the lower abutment section and the elastic member fits into the lower chamber.

16. The tooth implant system of claim 15, wherein the lower-chamber wall of the upper abutment has an abutment groove that receives a pushed-out portion of the elastic member when the screw is inserted and screws into the lower abutment receptacle, wherein the insertion of the screw deeper into the lower abutment receptacle pushes the ring lock-groove and the ring lock outwardly to force the elastic member against the inner chamber wall of the upper abutment and into the abutment groove.

17. The tooth implant system of claim 16, wherein the elastic member is made of stretchable material, formed as a pliable disc, so that when the elastic member is inserted in between the upper abutment and the lower abutment, the elastic member stretches and tightly fits into a hollow area between the upper abutment and the lower abutment.

18. The tooth implant system of claim 17, wherein the fixture section of the lower abutment has an indentation so that the bone of the patient would grow into the indentation after the tooth implant system is implanted in the patient.

19. The tooth implant system of claim 18, wherein the indentation is a pass-through hole in the fixture section so that the bone of the patient would grow into the indentation after the tooth implant system is implanted in the patient.

20. The tooth implant system of claim 19, wherein the ring lock has one or more ring protrusions extended from the inner ring that fit into one or more pits on the ring lock-groove.

\* \* \* \* \*